United States Patent

[11] 3,620,871

| [72] | Inventors | Boye Benzon-Petersen;<br>Rolf Magnus Dilot, both of Lund, Sweden |
|---|---|---|
| [21] | Appl. No. | 864,100 |
| [22] | Filed | Oct. 6, 1969 |
| [45] | Patented | Nov. 16, 1971 |
| [73] | Assignee | AB Akerlund & Rausing<br>Lund, Sweden |
| [32] | Priority | Dec. 25, 1968 |
| [33] | | Sweden |
| [31] | | 15995/68 |

[54] METHOD OF MAKING A PLASTIC PACKAGE WITH A LABEL
5 Claims, 8 Drawing Figs.

| [52] | U.S. Cl. | 156/212, 156/245, 156/321 |
|---|---|---|
| [51] | Int. Cl. | B29c 17/04 |
| [50] | Field of Search | 156/212, 245, 321, 306; 264/97 |

[56] References Cited
UNITED STATES PATENTS

| 3,108,850 | 10/1963 | Brandt | 264/97 |
|---|---|---|---|
| 3,091,000 | 5/1963 | Makowski | 156/212 X |
| 3,270,101 | 8/1966 | Jardine et al. | 156/245 X |
| 3,420,733 | 1/1969 | Ochi et al. | 156/245 X |
| 3,503,826 | 3/1970 | Nasica | 156/245 |

*Primary Examiner*—Carl D. Quarforth
*Assistant Examiner*—Stephen J. Lechert, Jr
*Attorney*—Pierce, Scheffler & Parker

ABSTRACT: A package is formed by deep-drawing a plastic foil into a mould in which has been placed a label having at least two sidewalls and a web connecting same. The label element is provided with a heat-sensitive adhesive on its inner surface so as to be secured to the plastic package by the heat of the deep-drawing step.

METHOD OF MAKING A PLASTIC PACKAGE WITH A LABEL

The present invention relates to a package of a plastic material and provided with a label, preferably made by deep-drawing by means of pressure and/or vacuum. The package is characterized in that a number of labels placed at different sidewalls hand together in that everyone of them is connected with a bottom label, the labels being attached to the plastic package proper by means of an adhesive sensitive to heat and applied to their inside. This adhesive has been activated by the heat provided for the deep-drawing, when the labels in advance have been placed in the mould, in which the forming of the plastic package has been made.

By the invention you derive i.e., the benefit that by means of a relatively thin plastic foil you can make very various forms of packages by means of a limited number of moulds. You can hereby give the packages produced a very good stiffness and at the same time a suitable decoration.

The invention is described in greater detail in the following with reference to the accompanying drawings which show some different embodiments of the package according to the invention.

Figure 7:
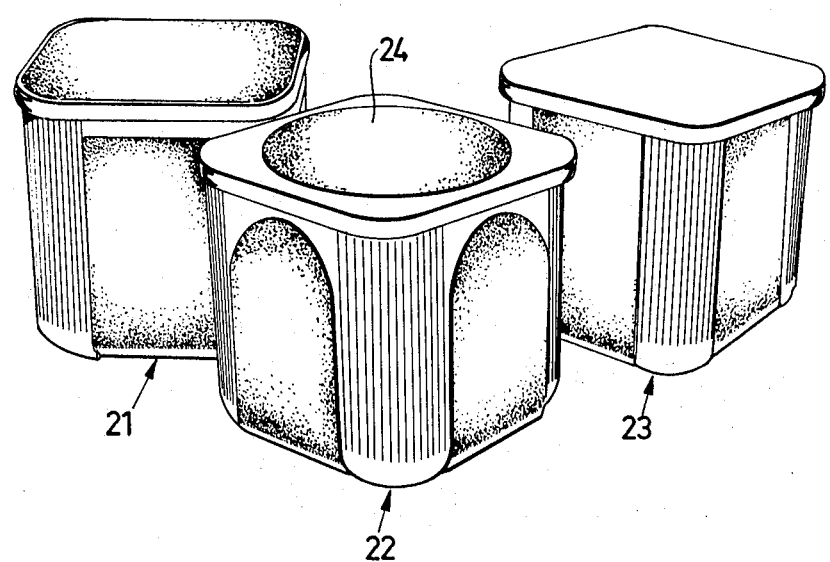
Figure 8:
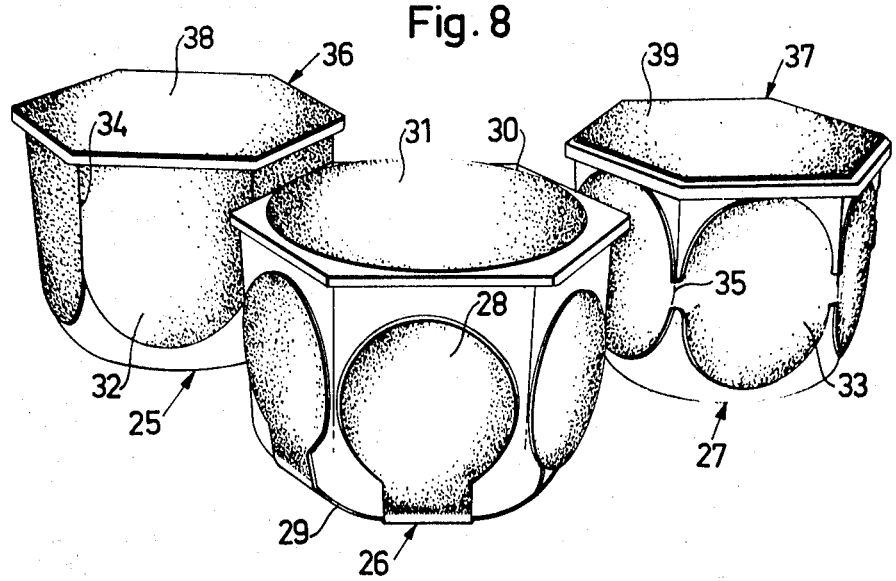

FIGS. 1-6 show hereby six different embodiments of the package according to the invention. In the same way the FIGS. 7 and 8 show two groups, each group containing three different embodiments of the subject matter of the invention.

Figure 1:
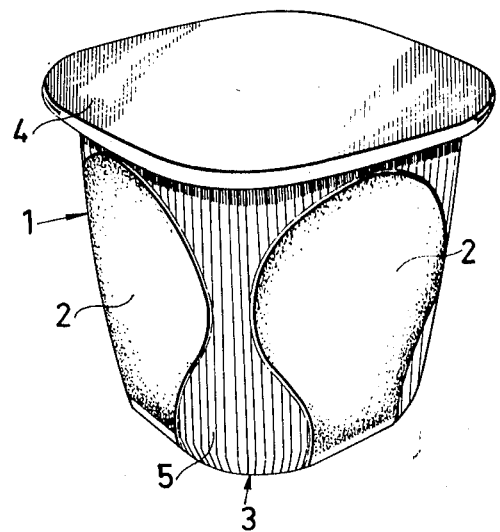

The package shown in FIG. 1 is preferably made by placing a paper or carton blank comprising four labels 2 and a bottom label 3 in a mould with the same dimensions as the outer dimensions of the finished package. Over this mould a plastic foil is clamped, which is deep-drawn into the mould by means of heat and vacuum and/or pressure. The labels are hereby attached to the plastic package proper by means of an adhesive sensitive to the action of heat and applied to their inside. This adhesive is preferably activated only by the heat provided for the deep-drawing. The package has thereafter been provided with a lid 4 in an arbitrary way. In order to stiffen the parts 5, which are not covered by the labels 2, the mould is provided with a pattern or design stiffening the package, e.g. a rifling as shown in the drawing.

Figure 2:
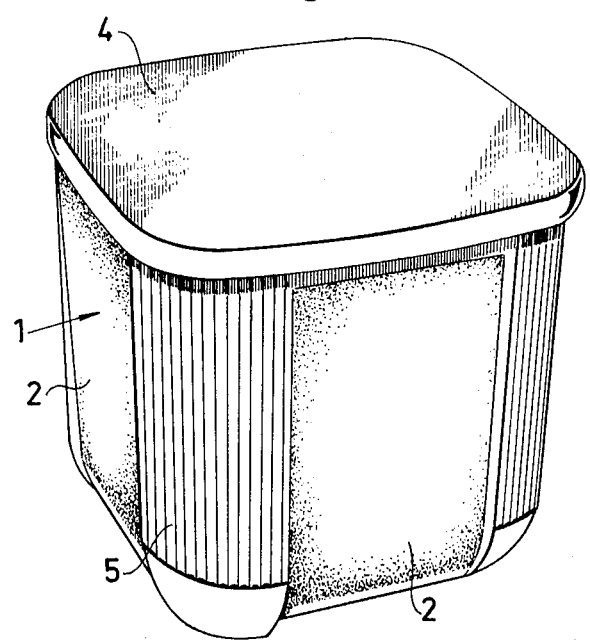

FIG. 2 shows a second embodiment of the subject matter of the invention. This embodiment differs from the one according to FIG. 1 essentially only through the form or design of the side labels 2. Therefore the same references are used as in FIG. 1.

Figure 3:
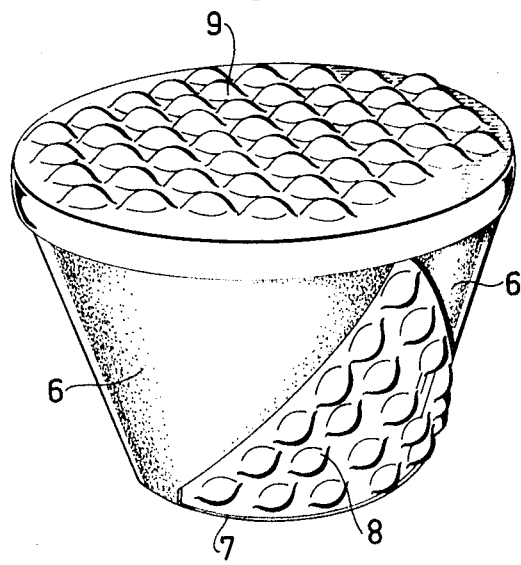

In FIG. 3 the invention has been applied to a round conical container which has been provided with two essentially triangular labels 6, which hang together by means of a bottom label 7 of which you can see only the edge. The label free parts 8 of the plastic container proper have hereby been provided with a ball pattern. A corresponding pattern is given also to the lid 9.

Figure 4:
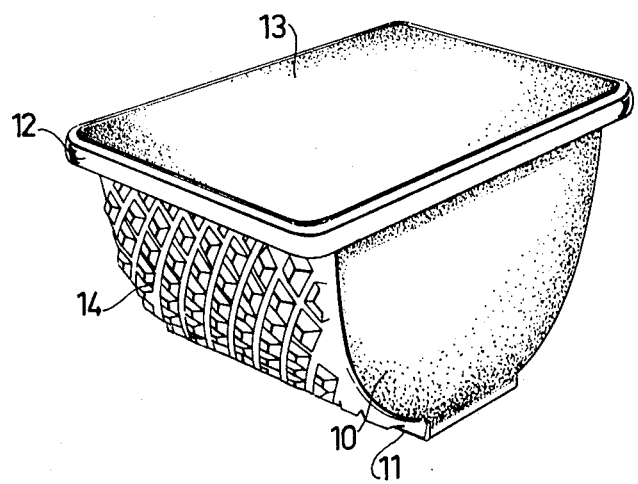

In FIG. 4 a cradlelike package with two side labels 10 is shown hanging together by means of a bottom label 11. Also the lid 12 has hereby been provided with a label 13. The label free parts 14 of the container have been provided with a stamped waffle pattern.

Figure 5:
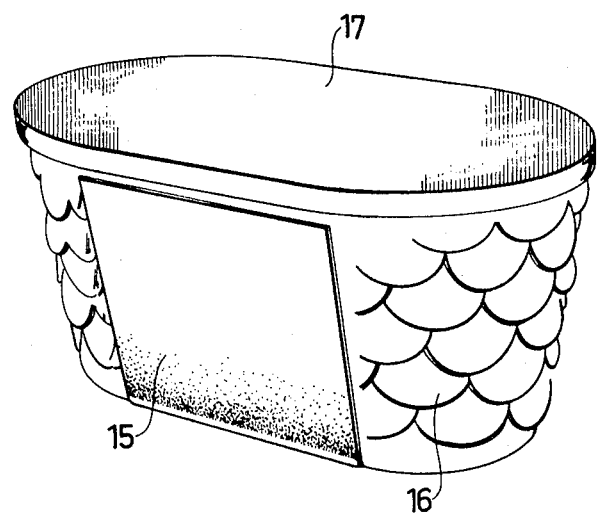

Also the package according to FIG. 5 is provided with two sidewall labels 15, of which only one is shown. These sidewall labels hang together by means of a bottom label not shown. The label free parts 16 of the package are provided with a fish-scalelike pattern which gives a very good stiffening effect. The package has thereafter been provided with a lid 17. If desired this lid can, of course, be provided with a label in the same way as shown in FIG. 4.

Figure 6:
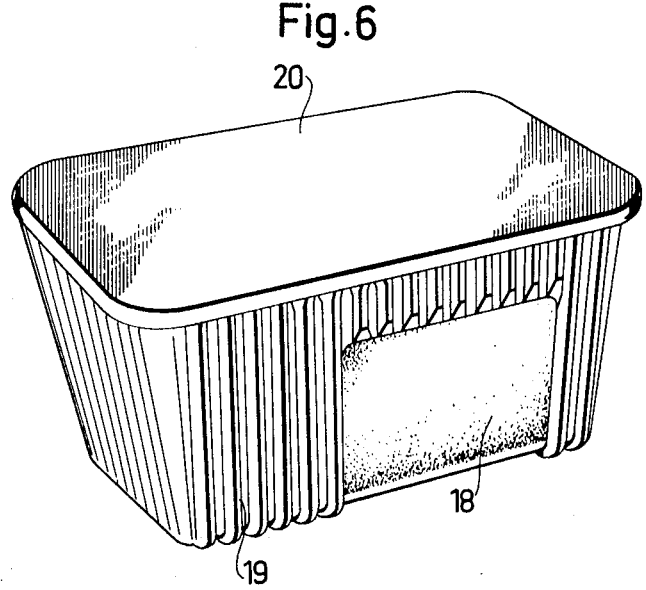

Also FIG. 6 shows a package provided with two sidewall labels 18, of which only one is shown. In the same way as shown in FIG. 5 these labels hang together by means of a bottom label not shown. The label free parts of the package are provided with a pronounced rifling pattern. The package has finally been provided with a lid 20. The side label 18 is shown in the figure displaced to the right. Preferably also the opposite label not shown is displaced, but in the opposite direction, whereby the label as a whole gets an angled form.

FIG. 7 is intended to make clear how by means of the same mould you can make three packages with essentially different appearance by varying the shape of the labels. The packages have here been designated by 21, 22 and 23, respectively. By varying as well the color as the shape of the labels, the different packages get as aforesaid, very different appearances. As shown by the middle package 22 the appearance can moreover be varied further in that the lid is provided with a label 24.

FIG. 8 finally shows in the same way three hexagonal packages made in the same mould. These packages have been designated by 25, 26, and 27, respectively. By the package 26 the six sidewall labels 28 hang together by a bottom label 29. A hexagonal lid 30 is here provided with a round label 31. The packages 25 and 27 can be said to be modifications of the subject matter of the invention. By these packages the sidewall labels 32 and 33 respectively hang together by means of narrow label ribbons 34 and 35 respectively. These ribbons run around the corners of the package proper. The two packages have been provided with hexagonal lids 36 and 37, each is provided with hexagonal labels 38 and 39, respectively.

The invention is of course not restricted to only the embodiments described above, but can be varied within the scope of the following claims. For instance, you can vary the shape and colors of the labels used to a greater extent than shown.

We claim:

1. A method of forming a plastic package bearing a label comprising inserting a label into a mold such that the label is contiguous to at least a portion of the inner surface of the mold, said label having a heat-sensitive adhesive on the side not contiguous to the inner surface of the mold, said label having at least two sidewalls and a web connecting said side walls, deep-drawing a plastic film into said mold to form a package, the heat of the deep-drawing step causing the adhesive to secure the label to the outer walls of said package.

2. A method as claimed in claim 1 wherein the connecting web extends across the bottom of the mould and reinforces the bottom of the package.

3. A method as claimed in claim 1 wherein the connecting web extends between adjacent side edges of the sidewalls to reinforce the corners of the package.

4. A method as claimed in claim 1 wherein the width of the connecting web is narrower than the width of the sidewalls of the label.

5. A method as claimed in claim 1 wherein the mould is recessed to accept the label and the remaining portions of the mould provide a three dimensional shape to the walls of the plastic package so as to provide stiffening thereof.